United States Patent [19]
Prasad et al.

[11] 3,852,268
[45] Dec. 3, 1974

[54] INOSINE-5-CARBOXYLIC ACID AMIDES

[75] Inventors: Raj Nandan Prasad, Pierrefonds, Quebec, Canada; Herman Hal Stein, Skokie, Ill.

[73] Assignee: Abbott Laboratories, North Chicago, Ill.

[22] Filed: Feb. 12, 1973

[21] Appl. No.: 331,397

[52] U.S. Cl............................ 260/211.5 R, 424/180
[51] Int. Cl............................................. C07d 51/54
[58] Field of Search .............................. 260/211.5 R

[56] References Cited
UNITED STATES PATENTS
3,697,504  10/1972  Schmidt........................ 260/211.5 R
FOREIGN PATENTS OR APPLICATIONS
2,034,785  1/1972  Germany...................... 260/211.5 R Primary Examiner—Johnnie R. Brown
Attorney, Agent, or Firm—Robert L. Niblack; Joyce R. Krei; Vincent A. Mallare

[57] ABSTRACT

Inosine-5'-carboxamides represented by the formula

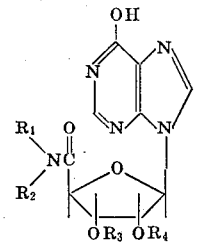

wherein $R_1$ and $R_2$ each are selected from the group consisting of hydrogen, loweralkyl, lowerhaloalkyl, lowerhydroxyalkyl, lowercycloalkyl, loweralkylcycloalkyl, loweralkenyl or loweralkynyl; and $R_3$ and $R_4$ each are hydrogen, acyl, or $R_3$ and $R_4$ taken together form an isopropylidene or benzylidene moiety, and the pharmaceutically acceptable salts thereof.

The compounds wherein $R_3$ and $R_4$ = hydrogen are useful as central nervous system depressants and antihypertensive agents. Compounds wherein $R_3$ and $R_4$ taken together form an isopropylidene or benzylidene moiety are intermediates useful in the preparation of the final products.

6 Claims, No Drawings

INOSINE-5'-CARBOXYLIC ACID AMIDES

DETAILED DESCRIPTION OF THE INVENTION

This invention relates to inosine-5'-carboxamides, to therapeutic compositions containing the compounds, to methods of preparing and using the compounds and to intermediates useful in the preparation of such compounds.

The compounds of this invention are represented by the formula

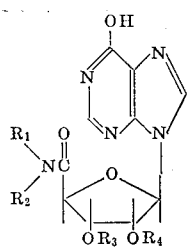

wherein $R_1$ and $R_2$ each are selected from the group consisting of hydrogen, loweralkyl, lowerhaloalkyl, lowerhydroxyalkyl, lowercycloalkyl, loweralkylcycloalkyl, loweralkenyl or loweralkynyl; and $R_3$ and $R_4$ each are hydrogen, acyl, or $R_3$ and $R_4$ taken together form an isopropylidene or benzylidene moiety, and the pharmaceutically acceptable salts thereof.

The term "loweralkyl" as used herein, refers to both straight and branched chain alkyl radicals containing from one to six carbon atoms, including methyl, ethyl, n-propyl, iso-propyl, n-butyl, sec-butyl, tert-butyl, iso-butyl, n-pentyl, iso-pentyl, neo-pentyl, n-hexyl and the like.

"Loweralkenyl" refers to the $C_2$ to $C_5$ alkyl groups, as defined above, from which a hydrogen atom has been removed from each of two adjacent carbon atoms to produce ethylenic unsaturation; e.g., vinyl, allyl, methallyl, 1-pentenyl and the like.

"Loweralkynyl" refers to the $C_2$ to $C_5$ alkyl groups as defined above, from which two hydrogen atoms have been removed from each of two adjacent carbon atoms to produce acetylenic unsaturation such as ethynyl, propargyl, 2-butynyl, 1-pentynyl and the like.

The term "cycloalkyl" refers to $C_3$–$C_6$ alkyl groups groups, namely, cyclopropyl, cyclobutyl, cyclopentyl and cyclohexyl.

The term "loweralkylcycloalkyl" refers to loweralkyl-cycloalkyl groups having a total of eight carbon atoms, such as cyclopropylmethyl, cyclopropylbutyl and the like.

The term "pharmaceutically acceptable acid addition salts" refers to non-toxic salts prepared by reacting the amide with an appropriate organic or inorganic acid, or by utilizing an acid addition salt of the appropriate intermediate. Representative salts include the hydrochloride, hydrobromide, sulfate, bisulfate, acetate, valerate, oleate, laurate, borate, benzoate, lactate, phosphate, tosylate, citrate, maleate, succinate, tartrate, napsylate and the like.

The term "acyl" refers to acetyl, propionyl, butyryl and the like.

The term "halo" includes chloro, fluoro, bromo, iodo.

The compounds of this invention are useful as sedatives at dosages of from 0.1 to 100 mg./kg. of body weight daily. They are additionally useful as antihypertensive agents at a dosage range of from 1-100 mg./kg.

Generally speaking, the compounds of this invention are prepared from 2',3'-isopropylidene inosine (Formula 1) by the following route:

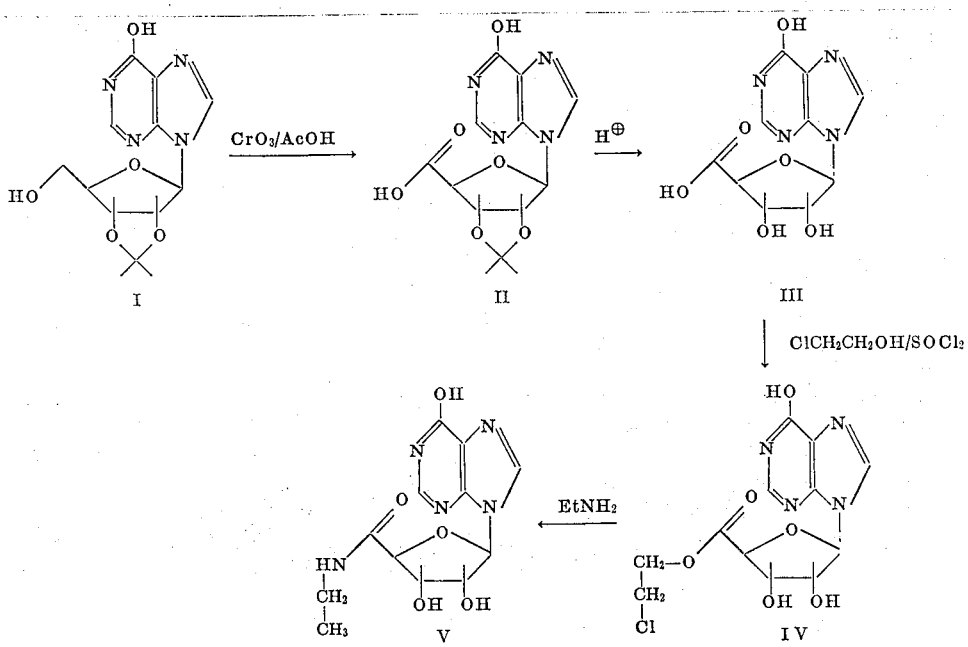

The following examples further illustrate this invention:

EXAMPLE 1

2',3'-O-Isopropylidene Inosine-5'-Carboxylic Acid

Chromium trioxide (12.0 g, 0.120 mole); freshly washed with glacial acetic acid) was added, portionwise, to a stirred solution of isopropylidene inosine (32.0 g; 0.0104 mole) in glacial acetic acid (500 ml.)

at the room temperature. Within a few hours, the dark reaction mixture spontaneously warmed up to 35° C. No attempt was made to control the temperature. The reaction mixture was stirred at the room temperature for 3 days. The crude acid was filtered, washed with cold acetic acid, followed by ether and finally the residue was washed with plenty of cold water to give a colorless solid. The solid, after drying over $P_2O_5$ in vacuum at 60° C. for 16 hours, was pure enough for the subsequent reactions. Yield — 24.0 g. (72 percent); m.p. 260° dec; $R_f$ 0.30; TLC: Isopropanol: $H_2O$: $NH_4OH$ = 7:2:1; characteristic IR band at 1,720 cm$^{-1}$.

EXAMPLE 2

Inosine-5'-carboxylic acid

A mixture of 2',3'-O-isopropylidene inosine-5'-carboxylic acid (6.4 g; 0.020 mole), concentrated HCl (30 ml.) and water (300 ml.) was kept at 60° C. for 30 minutes and then cooled to 0° C. The clear reaction mixture was brought to pH 2.5–3.0 by adding $NaHCO_3$ solution and the product was filtered and washed with cold water to yield 4.4 g. (79 percent) of inosine-5'-carboxylic acid, m.p. 170–175° C; $R_f$ 0.21; 7:2:1 isopropanol: $H_2O$: $NH_4OH$; characteristic IR band at 1,720 cm$^{-1}$.

EXAMPLE 3

Inosine-5'-(N-Chloroethyl) Carboxylate

Thionyl chloride (4ml.) was added dropwise to a suspension of inosine-5'-carboxylic acid (5.7 g; 0.0202 mole) in 2-chloroethanol (100 ml.) at 5°–10° C. After the addition was complete, the mixture was stirred at the room temperature for 3 hours and then poured into dry stirred ether (300 ml.). Ether was decanted carefully and the viscous layer was triturated with some more ether. The solid, so separated, was dissolved in cold water (30 ml.) and the clear aqueous solution was basified with saturated aqueous $NaHCO_3$ solution. The precipitate was filtered off, washed successively with water, acetone and ether and dried in vacuum for 4 hours over $P_2O_5$ at 65° C.

Yield — 5.5 g (80 percent); m.p. 177°–180°. Infrared spectra showed the characteristic band at 1,750 cm$^{-1}$; $R_f$ 0.35; 43:7 n-butanol: $H_2O$).

EXAMPLE 4

Inosine-5'-(N-Ethyl) Carboxamide Monohydrate

5'-($\beta$-Chloroethyl) inosine carboxylate (2.0 g; 0.0058 mole) was added to monoethylamine (50 ml.) at $-20°$ C. The clear mixture was allowed to warm up to the room temperature. After stirring for 3 hours, the mixture was triturated with ether (200 ml.) and filtered to give 1.6 g. of the crude product. The residue was recrystallized twice from absolute ethanol and then dried over $P_2O_5$ in vac. at 56° C. to give the pure product V (1.0g; 53 percent) (m.p. 160°–170° C.) having the characteristic infra-red absorption band at 1,680 cm$^{-1}$; $R_f$ 0.25 (43:7 n-butanol: $H_2O$). Nmr spectra confirmed the structure of the compound, and showed the presence of a mole of water.

Analysis calcd. for $C_{12}H_{15}N_5O_5.H_2O$: C, 44.03; H, 5.20; N, 21.40
Found: C, 44.15; H, 4.92; N, 21.28

EXAMPLE 5

Inosine-5'-(N-Ethyl) Carboxamide

5'-($\beta$-Chloroethyl) inosine carboxylate (4.0 g: 0.0116 mole) was added to liquid ethylamine (75 ml.) at $-20°$ C. The stirred mixture was allowed to warm up to the room temperature. After 2 hours at the room temperature, the product was precipitated out as a gum by adding dry ether. The gummy solid was purified by two recrystallizations from absolute ethanol to give the hydrated product, 2.3 g. (m.p. 160°–170° C). When this was dried in high vacuum over $P_2O_5$ for 3 hours at 65°, the anhydrous inosine-5'-(N-ethyl) carboxamide was isolated; m.p. 243°–45° C.

The anhydrous product had the same characteristic infra-red absorption spectra and the $R_f$ value as the monohydrate.

Analysis calcd. for $C_{12}H_{15}N_5O_5$: C, 46.40; H, 4.85; N, 22.65
Found: C, 46.75; H, 4.97; N, 22.79

Nmr spectra confirmed the structure.

EXAMPLE 6

Inosine-5'-(N-allyl) carboxamide is prepared according to the method of Example 5 by reacting 5'-($\beta$-chloroethyl) inosine carboxylate with allylamine.

EXAMPLE 7

Inosine-5'-(N,N-dimethyl carboxamide is prepared according to the method of Example 5 by reacting 5'-($\beta$-chloroethyl) inosine carboxylate with dimethylamine.

EXAMPLE 8

Inosine-5'-(N-cyclopropyl) carboxamide, m.p. 262°–263° (dec.), was prepared according to the method of Example 5 by reacting 5'-($\beta$-chloroethyl) inosine carboxylate with cyclopropylamine.

EXAMPLE 9

Inosine-5'-(N-propargyl) carboxamide is prepared according to the method of Example 5 by reacting 5'-($\beta$-chloroethyl) inosine carboxylate with propargylamine.

EXAMPLE 10

Inosine-5'-(N-$\beta$-hydroxyethyl) carboxamide is prepared according to the method of Example 5 by reacting 5'-($\beta$-chloroethyl) inosine carboxylate with hydroxyethylamine.

The compounds of this invention can be formulated into various pharmaceutical dosage forms such as tablets, capsules, pills and the like for immediate or sustained release by combining the active compound with a suitable pharmaceutically acceptable carrier or diluent according to methods well known in the art. Such dosage forms may additionally include excipients, binders, fillers, flavoring and sweetening agents and other therapeutically inert ingredients necessary in the formation of the desired pharmaceutical preparation.

EXAMPLE 11

Compounds containing 5 mg. of inosine-5'-(N-ethyl)

carboxamide and having the following composition are prepared according to methods well known in the art.

| | |
|---|---|
| Inosine-5'-(N-ethyl) carboxamide | 5 mg. |
| Starch | 15 mg. |
| Colloidal Silica | 3 mg. |
| Magnesium stearate | 2 mg. |

Compositions suitable for parenteral administration can also be prepared by methods well known in the art by combining the active compound in a suitable sterile carrier such as water. Such dosage forms may be stored in ampoules which can be used for unit dosage administration.

We claim:

1. A compound of the formula

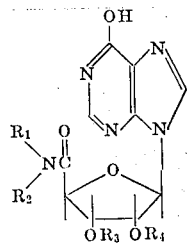

wherein $R_1$ and $R_2$ each are selected from the group consisting of hydrogen, loweralkyl, lowerhaloalkyl, lowerhydroxyalkyl, lowercycloalkyl, loweralkylcycloalkyl, loweralkenyl or loweralkynyl; and $R_3$ and $R_4$ each are hydrogen, loweralkanoyl, or $R_3$ and $R_4$ taken together form an isopropylidene or benzylidene moiety, and the pharmaceutically acceptable salts thereof.

2. A compound of claim 1 wherein $R_1$ and $R_2$ each are hydrogen or loweralkyl.

3. A compound in accordance with claim 1 wherein each $R_1$ and $R_2$ are hydrogen or haloalkyl.

4. A compound in accordance with claim 1, inosine-5'-(N-ethyl) carboxamide.

5. A compound in accordance with claim 1, inosine-5'-(N-ethyl) carboxamide monohydrate.

6. A compound in accordance with claim 1: inosine-5'-(N-cyclopropyl)carboxamide.

* * * * *